United States Patent [19]

Johnson

[11] 4,325,860

[45] Apr. 20, 1982

[54] POLYMERS CHARACTERIZED BY 1,3-IMIDAZOLIDINE-1,3-DIYL RINGS PLASTICIZED WITH AROMATIC SULFONES OR AROMATIC SULFOXIDES

[75] Inventor: Burnett H. Johnson, Baytown, Tex.

[73] Assignee: Exxon Research & Engineering Co., Florham Park, N.J.

[21] Appl. No.: 229,241

[22] Filed: Jan. 28, 1981

[51] Int. Cl.$^3$ ............................................. C08K 5/36
[52] U.S. Cl. .................................. 324/155; 524/170; 524/171; 524/589
[58] Field of Search .................. 260/30.8 R, 30.8 DS

[56] References Cited

U.S. PATENT DOCUMENTS

| | | | |
|---|---|---|---|
| 3,402,204 | 9/1968 | Plummer et al. | 260/607 |
| 3,542,704 | 11/1970 | Radcliff et al. | 260/2.5 |
| 3,609,113 | 9/1971 | Schade | 260/30.2 |
| 3,661,859 | 5/1972 | Patton | 260/77.5 |
| 3,718,620 | 2/1973 | Hart et al. | 260/30.8 R |
| 3,960,684 | 6/1976 | Feinberg | 204/159.11 |
| 4,026,861 | 5/1977 | Cessna, Jr. | 260/30.8 R |
| 4,131,625 | 12/1978 | Arnold et al. | 260/607 AR |
| 4,147,684 | 4/1979 | Patton | 260/30.8 R |

*Primary Examiner*—Joseph L. Schofer
*Assistant Examiner*—Bernard Lipman
*Attorney, Agent, or Firm*—M. B. Kurtzman

[57] ABSTRACT

Normally intractable polymers of the structure:

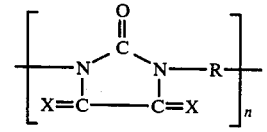

wherein X is O or NH, provided at least one X is O, R is an organic moiety, such as poly(parabanic acids) are plasticized by composition with from 15 to 60 weight percent of an aromatic sulfone or aromatic sulfoxide such as diphenyl sulfone, diphenyl sulfoxide or dibutyl-4,4'-sulfonyl dibenzoate.

33 Claims, No Drawings

POLYMERS CHARACTERIZED BY 1,3-IMIDAZOLIDINE-1,3-DIYL RINGS PLASTICIZED WITH AROMATIC SULFONES OR AROMATIC SULFOXIDES

BACKGROUND OF THE INVENTION

1. Field of the Invention

The present invention relates to the discovery of a specific class of plasticizers for poly(iminoimidazolidinediones) and poly(parabanic acid) resins.

2. Prior Art

Both the poly(iminoimidazolidinediones) and poly (parabanic acids) and their methods of preparation are known and described in detail in commonly assigned U.S. Pat. No. 3,661,859, which is incorporated in its entirety herein. The poly(parabanic acids) may also be prepared by other processes, such as shown in U.S. Pat. No. 3,609,113.

The poly(iminoimidazolidinediones) may be formed by the reaction of hydrogen cyanide with a diisocyanate or mixture of diisocyanates, the reaction of a dicyanoformamide with a diisocyanate or mixtures of diisocyanates, or the polymerization of a cyanoformamidyl isocyanate and contain a 1,3-imidazolidinedione-1,3-diyl ring of the following structures in the repeat units:

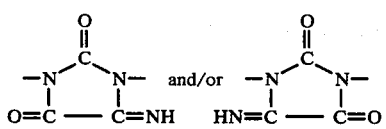

wherein NH is in the 4 or 5 position.

The poly(parabanic acids) also designated as poly(1,3-imidazolidine-2,4,5-triones) may be prepared, for example, by the acid hydrolysis of poly(iminoimidazolidinediones) and contain the imidazolidinetrione ring in the repeat unit:

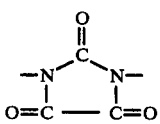

U.S. Pat. No. 3,609,113 and German Patent No. 1,770,146 describe other methods for preparing polymers which contain the poly (parabanic acid) ring.

The polymers may contain both imino-1,3-imidazolidinedione-1,3-diyl rings and imidazolidinetrione rings, thus the present polymers may be broadly characterized as having the repeating unit:

wherein Q is

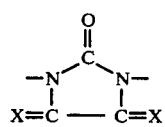

wherein X is O or NH, provided that at least one X is O, R is an organic moiety which may be aliphatic, alicyclic, aromatic or mixtures thereof, and n is sufficiently large to produce a solid product.

The R is the organic moiety of the diisocyanate when the polymer is produced according to the procedure in U.S. Pat. No. 3,661,859. Thus, the diisocyanates may be selected from a broad group having a large variety of organic moieties. The organic moieties of the diisocyanate may be substituted with groups such as alkyl, aryl, halogens, sulfoxy, sulfonyl, alkoxy, aryloxy, oxo, ester, alkylthio, arylthio, nitro and the like which do not react with the isocyanate group. Functional groups which have active hydrogen atoms, (e.g., carboxylic acids, phenols, amines, etc.) should not be present. Specific diisocyanates which may be used are set out in U.S. Pat. No. 3,661,859, other patents, articles or organic textbooks as known in the art.

Some of the parabanic acid polymers have been found to have high glass transition temperatures, and thus, are especially suitable as magnetic tapes (where good dimensional stability at high temperatures is required), films for use in flexible printed circuits, cable wraps, etc., for fibers such as tire cord fibers (where tensile strength and modulus are required), for moldings for electrical connectors, bearings, magnetic wire insulation, coatings for cables, cookware, glass fabrics, industrial belts (where high temperatures are required) and the like.

However, many of the present polymers decompose when they are heated at or above their glass transition temperatures and as a result they can not be molded or extruded. Previously these polymers could be processed only by solution methods or by a powder coating technique which also requires a solvent.

It is an advantage of the compositions of the present invention that the poly(iminoimidazolidinediones), poly(imidazolidine-2,4,5-tiones) or mixed poly(iminoimidazolidine-1,3-dione/imidazolidine-2,4,5-triones) or as defined above the polymers

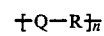

may be processed by extrusion and molding techniques, when plasticized according to the present invention. Also films of the compositions of the present invention can be heat-sealed whereas films of the same pure polymers can not be sealed with heat. It is a particular advantage of the present plasticizers in that they are not detrimental to copper chelate thermal stabilizers frequently employed in the films, whereas many other materials investigated as plasticizers do adversely effect the thermal stability.

SUMMARY OF THE INVENTION

Briefly, the present invention is a plasticized composition comprising heterocyclic polymers characterized in the repeating unit by the tri-substituted 1,3-imidazolidine-1,3-diyl ring:

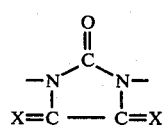

wherein X=O or NH, provided at least one X is O or more specially polymers having the repeating unit:

wherein Q is

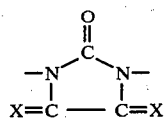

and X has the significance set out above, R is an organic moiety which may be aliphatic, alicyclic, aromatic or mixtures thereof and n is sufficiently large to produce a solid product and a plasticizing amount of aromatic sulfones or aromatic sulfoxides.

More particularly, the polymers may be poly(iminoimidazolidinediones) characterized by a tri-substituted 1,3-imidazolidine-1,3-diyl ring of the following structure:

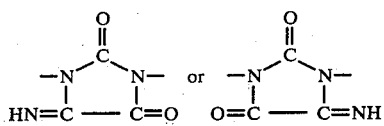

poly(parabanic acids) characterized by a tri-substituted 1,3-imidazolidine-1,3-diyl ring of the following structure:

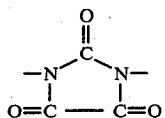

or more specifically, polymers of the general structure:

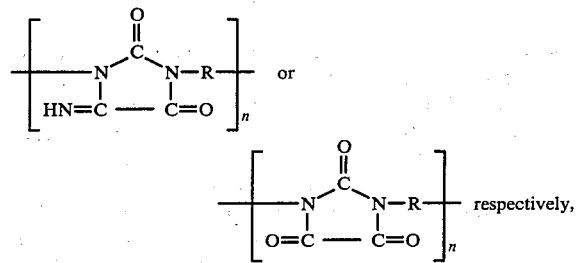 respectively, wherein R and n have the significance given above.

The plasticized compositions of the present invention are capable of being melted without decomposition. The polymers may be films, powders or the like.

The term "plasticizing amount" as used herein means that amount of aromatic sulfone or aromatic sulfoxide, which is incorporated in and compatible with the polymer to form a homogeneous composition. Generally, the plasticizer incorporated into the polymer will comprise from 10 to 50 weight percent of the total weight of polymer and plasticizer, although the plasticizers may be used in slightly smaller amounts, i.e., about 5% and in somewhat larger amounts, e.g., up to about 60%. Preferably up to about 30 weight percent of the plasticizer will be employed.

DETAILED DESCRIPTION OF THE INVENTION

The plasticizers useful for the present invention are aromatic sulfones and aromatic sulfoxides and more specifically diaromatic sulfones and diaromatic sulfoxides represented by the formulas:

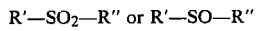

$R'-SO_2-R''$ or $R'-SO-R''$ wherein R' and R'' are like or unlike aryl radicals, alkaryl radicals and araryl radicals. Preferably, R' and R'' radicals have 6 to 12 carbon atoms and include derivatives of benzene, diphenyl, naphthalene, toluene, xylene, and the like. Some specific compounds which may be used as plasticizers in the present invention include diphenyl sulfone, phenyl tolyl sulfone, ditolyl sulfone, xylyl tolyl sulfone, dixylyl sulfone, tolyl paracymyl sulfone, phenyl biphenyl sulfone, tolyl biphenyl sulfone, xylyl biphenyl sulfone, phenyl naphthyl sulfone, tolyl naphthyl sulfone, xylyl naphthyl sulfone, diphenyl sulfoxide, phenyl tolyl sulfoxide, ditolyl sulfoxide, xylyl tolyl sulfoxide, dixylyl sulfoxide, tolyl paracymyl sulfoxide, phenyl biphenyl sulfoxide and aromatic sulfones and sulfoxides of substituted aromatic compounds which substituents do not inhibit the plasticizing effect of the material nor react to degrade the polymer. In particular, substituent groups which have active hydrogen atoms (e.g., carboxylic acids, phenols, amines, etc.) should not be present. Examples of substituent groups which do not interfere with the plasticizing effect include alkoxy or aryloxy carbonyl groups, halogens such as bromine, chlorine or fluorine, aryloxy or alkoxy groups, and sulfur containing groups.

The presence of a plasticizer in the polymers described herein will, as is the known effect of plasticizers, result in different film properties at elevated temperatures, compared to unplasticized polymer film, that is, polymer films not containing plasticizer. Generally, plasticizers are incorporated in the polymer in amounts of about 10 to 30 weight percent which will produce lower softening points than the polymer without the plasticizer incorporated therein.

The plasticized polymer is thus desirably softened at high temperatures so that films of these compositions may be sealed by heat. Films of the present unplasticized polymers are however difficult to heat seal because of their very high softening temperatures, because the polymer does not flow enough to coalesce into a single phase. Moreover, other materials employed in conjunction with the polymer may be damaged by the high temperatures required to seal the unplasticized polymer.

It was found that conventional plasticizers such as mixtures of N-ethyl-o-toluene sulfonamide and N-ethyl-p-toluene sulfonamide and mixtures of o-toluene sulfonamide and p-toluene sulfonamide were not useful for plasticizing the present polymers in melts. Generally, the compositions containing these plasticizers melted but were subject to decomposition at the temperatures required to melt the blends if normal mixing procedures were used, i.e., adequate blending time of the polymer and plasticizer. Those blends which were melted in small batches for only a few minutes exhibited poor thermal stability when heating and mixing were continued.

These problems are substantially overcome by the use of aromatic sulfones or aromatic sulfoxides as plasticizers according to the present invention.

The present plasticizers may be incorporated into the polymers in solution, such as dimethylformamide solutions of polymer used for casting or coating or in dry polymer compositions for melt extrusion.

The polymer-plasticizer compositions according to the present invention are stable meltable composition and may be extruded without degradation. The extrusions may be carried out at temperatures in the range of 250° to 330° C. The extrudates of the invention compositions were tough, smooth clear and yellow to amber colored.

ILLUSTRATIVE PREFERRED EMBODIMENTS

For purpose of illustration, but not for exclusion, the majority of the examples illustrating the invention will be described in specific with respect to a particular polymer. That is, a poly(parabanic acid) prepared from diphenylmethane diisocyanate in accordance with proprietary techniques well described in patents assigned to Exxon Research and Engineering Company to result in a high performance polymer having the repeating unit shown below:

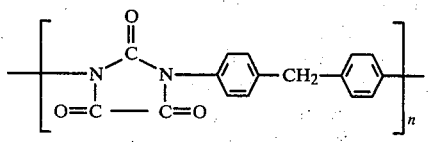

which is also designated as poly[1,4-phenylenemethylene-1,4-phenylene-1,3-(imidazolidine-2,4,5-trione)] which is also designated in chemical abstracts as poly [(2,4,5-trioxo-1,3 imidazolidinediyl)-1,4-henylenemethylene-1,4-phenylene]. It has a high glass transition temperature of 290° C. and can not be extruded or molded.

For purposes of convenience, these polymer species will be referred to as PPA-M. It will be recognized that other polyparabanic acids (PPA) can be prepared from other monomers so that the diphenyl methane group will be replaced by other organic moieties.

In general, the preferred polymers of the polymer-plasticizer compositions are those which have sufficient repeating units at room temperature to be solids.

In addition to the polymer and plasticizers, it is contemplated that other appropriate additives which are not detrimental to the compositions such as those employed to stabilize against oxidation or ultraviolet light, flame retardants, pigments, fillers and the like may be present.

As noted above, a particular advantage to the use of the present plasticizers is that they are not detrimental to the effectiveness of copper/chelate oxidation stabilizers as disclosed in commonly assigned U.S. Pat. No. 4,022,751.

The chelating compounds are illustrated by dicarboxylic, acids, e.g., malonic acid; hydroxy acids, hydroxy aldehydes, e.g., salicylaldehyde; β-diketones, e.g., acetylacetonates; keto esters, e.g., ethylacetoacetate and diphenyl ketones, e.g., 2-hydroxyphenonls.

The various organic moieties of the chelating agents may be substituted with various radicals such as alkyls having up to 12 carbon atoms, alkoxy radicals having up to 12 carbon atoms, aryl, and arloxy having up to 12 carbon atoms and groups pendant thereon capable of forming a salt with copper such as carboxylics, sulfonics or the like, such as sulfo or carboxy.

Suitable radicals include methyl, ethyl, propyl, butyl, pentyl, hexyl, heptyl, octyl, nonyl, decyl, undecyl, dodecyl, methoxy, ethoxy, propoxy, butoxy, pentyloxy, hexoxy, heptoxy, octyloxy, nonoxy, decoxy, undecoxy, dodecoxy, phenyl, benzyl, tolyl, napthyl, phenyloxy, benzyloxy and napthyloxy.

Some other specific copper chelates include the copper chelate of 2-hydroxybenzophenone, 2-hydroxy-4-methoxy-5-sulfobenzophenone, 2-hydroxy-4-methoxy-2'-carboxybenzophenone, 2,2'-dihydroxy-4-methoxybenzophenone, 2-hydroxy-4-methoxy-benzophenone, 8-quinolinolate and benzoyl acetonate (cupric).

The following examples illustrate the present invention and should not be construed as limiting the scope thereof.

EXAMPLES 1–5

Films were prepared by dissolving PPA-M in dimethyl formamide and adding the designated plasticizer in an amount to provide the corresponding weight percent in the dried film. The solutions were cast and dried to produce 1 mil films which were heat sealed and then tested for peel strength. The compositions, heat seal preparation and test results are shown in TABLE I.

TABLE I

| Example | Diphenyl Sulfone Wt % in dry PPM-Film | Minimum Heat Sealing Temperature* | Peel Strength Lbs/Inch |
|---|---|---|---|
| 1 | 0 | 290° C. | 1.2[a] |
| 2 | 5 | 260° C. | 4.0[a] |
| 3 | 10 | 250° C. | 2.9[a] |
| 4 | 15 | 240° C. | 3.9[a] |
| 5 | 5 | 260° C. | 4.0[b] |

*Sealed in platen press for 30 seconds at 400 psi.
[a]Sealed film-to-film
[b]Sealed film-to-Yates A-treated copper foil. Film tore at 4.0 lbs/inch to stress instead of peeling.

EXAMPLE 6

This example demonstrates that there is substantially little loss of strength of the films plasticized in accordance with this invention.

A film was made in the same manner as in Examples 1–5, by forming a solution of 400 grams of PPA-M in 1,600 grams of dimethyl formamide at room temperature and adding 20 grams of diphenylsulfone plasticizer thereto. The solution was cast and dried to produce a 3.5 mil thick film. The film had a tensile strength of 14,604 psi and a % elongation of 41. The tensile strength compares favorably with the PPA film in the absence of the plasticizer which had a tensile strength of 14,750 psi.

EXAMPLE 7–11

PPA-M resin and N N-dimethylformamide, DMF, were weighed into a stirred vessel in the ratio to yield 20% weight percent of resin in the film casting solution. Two weight percent of the copper salt/chelate of 2-hydroxy-4-methoxybenzophenone-5-sulfonic acid (an oxidation stabilizer) and the plasticizer, if any, as shown in TABLE III, to be evaluated were added and the resulting mixture was stirred until resin, stabilizer and plasticizer were completely dissolved.

The resulting film casting solutions were used to prepare film (1 mil) by coating a wet film onto a continuously moving stainless steel belt which conveyed the film through a drying oven after which the film was stripped from the belt and taken up as a roll. The residual DMF left in the film was less than 0.5%.

The films were aged in a circulating air at 230° C. for the time indicated in Table III after which the percent tensile elongation was measured using ASTM procedure D-638-72. The results are reported in TABLE III. It is evident from the results that the three commercial plasticizers severely reduced the oxidative stability of PPA-M to an unacceptable level compared to the unplasticized film A.

Example 8 contains neither copper chelate nor plasticizer and serves, by comparison to Example 9, to illustrate the normal high stability achieved with the copper chelate in the absence of plasticizer.

TABLE II

| | Plasticizers | | Percent Retention of Tensile Elongation Days Aged | | | | |
|---|---|---|---|---|---|---|---|
| Example | Compound | Wt. % | 0 | 21 | 35 | 49 | 63 |
| 7 | None* | -0- | 100 | -0- | -0- | -0- | -0- |
| 8 | None | -0- | 100 | 79 | 77 | 54 | 35 |
| 9 | Triphenylphosphate | 15 | 100 | 42 | 26 | -0- | -0- |
| 10 | Tricresylphosphate | 15 | 100 | 50 | 39 | -0- | -0- |
| 11 | N-ethyl-mixed o,p-toluenesulfonamide | 15 | 100 | 55 | 50 | 13 | -0- |

*Does not contain copper chelate stabilizer

EXAMPLES 12-17

The same procedure as Examples 8-12 was used to produce the films evaluated here. The compounds tested as plasticizers are not considered to be commercial plasticizers but which effectively plasticize PPA-M. The oxidation stabilizer (copper salt/chelate of 2-hydroxy-4-methoxy-benzophenone-5-sulfonic acid) was present at 1.5 weight percent. The films were aged at 215° C. in a circulating air oven for the time intervals indicated in TABLE IV after which the propagating tear strengths were measured using ASTM procedure D 1938-67. The test results are reported in TABLE IV. From the results diphenyl sulfone is clearly superior in that essentially no loss of oxidative stability is observed compared to the unplasticized PPA-M film, whereas the other compounds tested resulted in substantial degradation of the effectiveness of the stabilizer.

TABLE III

| | Plasticizers | | Percent Retention of Propating Tear Strength Days Aged | | | | |
|---|---|---|---|---|---|---|---|
| Example | Compounds | Wt % | 0 | 14 | 28 | 42 | 56 |
| 12 | None | 0.0 | 100 | 75 | 56 | 47 | 36 |
| 13 | Diphenyl Sulfone | 10.0 | 100 | 77 | 61 | 33 | 29 |
| 14 | Diphenyl Sulfone | 15.0 | 100 | 86 | 71 | 50 | 37 |
| 15 | Hexamethylphosphoramide | 10.0 | 100 | 50 | 30 | -0- | -0- |
| 16 | Triphenylphosphine | 15.0 | 100 | 42 | -0- | -0- | -0- |
| 17 | Triphenylphosphite | 15.0 | 100 | 45 | 26 | -0- | -0- |

EXAMPLES 18-20

The same procedure was employed as in Examples 8-12. The copper salt/chelate of 2-hydroxy-4-methoxybenzophenone-5-sulfonic acid was employed at 1.5 weight percent. The two compounds were found to plasticize PPA-M film to make it heat sealable. The films were aged at 215° C. in a circulating air oven for the period of time indicated in TABLE V. The propagating tear strength were measured after each aging interval using ASTM procedure D 1938-67 to determine the degree to which the plasticizer reduced the oxidative stabilizing effectiveness of the copper salt/chelate oxidation inhibitor. The results are reported in TABLE V. The results show that the diphenyl sulfoxide was essentially as good as the diphenyl sulfone in not degrading the oxidation inhibitor.

TABLE IV

| | Plasticizers | | Percent Retention of Propatating tear Strength Days Aged | | | | |
|---|---|---|---|---|---|---|---|
| Example | Compounds | Wt % | 0 | 14 | 28 | 42 | 56 |
| 18 | None | -0- | 100 | 70 | 55 | 45 | 36 |
| 19 | Diphenyl Sulfoxide | 10 | 100 | 69 | 56 | 43 | 27 |
| 20 | Mixed o,p-toluene sulfonamide | 10 | 100 | -0- | -0- | -0- | -0- |

EXAMPLE 21

850 grams of PPA-M ($\eta$inh=0.98) dry mix composition with 150 grams of diphenyl sulphone was prepared and the conditions for extrusion determined.

The Brabender extruder which was used had a 0.75 inch barrel with an L/D ratio of 20:1. It was fitted with either a ⅛ inch heated rod die or a heated 2" wide adjustable thickness ribbon die. The barrel had two heated zones. The screw had 10 flights feed, 5 flights compression, and 5 flights metering. The compression ratio was 3:1.

Extrusion
Zone 1: 285° C.; Zone 2: 290° C.
Die: 275° C. 40–80 rpm; Die pressure: 3500–4500 psi; color of extrudate: yellow with greenish tinge; appearance of extrudate: relatively smooth with some roughness, tough weight change of extrudate (milled powder at 190° C., four samples)

| Sample | A | B | C | D |
|---|---|---|---|---|
| Original wt. grams | 5.00127 | 5.00203 | 5.00127 | 5.00203 |
| Wt. after 36 hours | 4.89649 | 4.90545 | 4.89131 | 4.90173 |
| Wt. loss % | −2.10 | −1.93 | −2.20 | −2.00 |

The invention claimed is:

1. A plasticized composition comprising heterocyclic polymers characterized in the repeating units by the tri-substituted 1,3-imidazolidine-1,3-diyl ring:

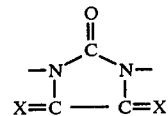

wherein X=O or NH, provided at least one X is O and a plasticizing amount of aromatic sulfone or aromatic sulfoxide.

2. A composition comprising heterocyclic polymers having the repeating unit:

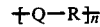

wherein Q is

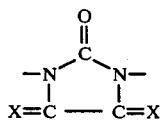

X=O or NH, provided at least one X is O, R is an organic moiety which may be aliphatic, alicyclic, aromatic or mixtures thereof and n is sufficiently large to produce a solid product and a plasticizing amount of aromatic sulfone or aromatic sulfoxide.

3. The composition according to claim 2 wherein said plasticizer is present in an amount of from 5 to 60 weight percent based on the total weight of polymer and plasticizer.

4. The composition according to claim 3 wherein from 10 to 30 weight percent of plasticizer is present.

5. The composition according to claim 2 wherein said aromatic sulfone or aromatic sulfoxide is diaromatic sulfone or diaromatic sulfoxide.

6. The composition according to claim 5 wherein the plasticizer is diaryl sulfone.

7. The composition according to claim 5 wherein the plasticizer is diaryl sulfoxide.

8. The composition according to claim 6 wherein the plasticizer is diphenyl sulfone.

9. The composition according to claim 6 wherein said plasticizer is dibutyl 4,4'-sulfonyl dibenzoate.

10. The composition according to claim 7 wherein said plasticizer is diphenyl sulfoxide.

11. The composition according to claim 2 wherein the polymer has the structure:

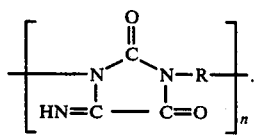

12. The composition according to claim 2 wherein the polymer has the structure:

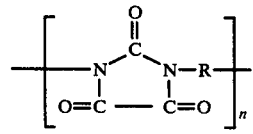

13. The composition according to claims 11 or 12 wherein the R group is methylenediphenyl.

14. The composition according to claims 11 or 12 wherein the R group is oxydiphenyl.

15. The composition according to claims 11 or 12 wherein the R group is a mixture of methylenediphenyl and 2,4-tolylenediyl groups.

16. The composition according to claims 11 or 12 wherein the R group is a mixture of methylenediphenyl and bitolylenediyl groups.

17. The composition of either claims 1, 2, 6, 7, 8, 9, 10, 11 or 12 wherein said plasticizer is incorporated into said polymer.

18. The composition according to claim 17 wherein said polymer is a film.

19. The composition of either claims 1, 2, 11 or 12 wherein said plasticizer is diphenyl sulfoxide.

20. The composition according to claim 16 wherein said plasticizer is diphenyl sulfone.

21. The composition according to claim 17 wherein said plasticizer is incorporated into said polymer in a solvent solution of said polymer.

22. The composition according to claims 1, 2, 11 or 12 wherein said plasticizer is diaryl sulfone or diaryl sulfoxide.

23. The composition according to claim 19 wherein said plasticizer is diaryl sulfone.

24. The composition according to claim 22 wherein said plasticizer is diaryl sulfoxide.

25. The composition according to claims 1, 2, 11 or 12 wherein said plasticizer is diphenyl sulfone, diphenyl sulfoxide or dibutyl -4,4-sulfonyl dibenzoate.

26. The composition according to claim 25 wherein said plasticizer is diphenyl sulfone.

27. The composition according to claim 25 wherein said plasticizer is diphenyl sulfoxide.

28. The composition according to claim 25 wherein said plasticizer is dibutyl-4,4'-sulfonyl dibenzoate.

29. The composition according to claims 1, 2, 11 or 12 containing from about 5 to 60 weight percent of plasticizer based on the total weight of polymer and plasticizer.

30. The composition according to claim 29 containing 10 to 50 weight percent of plasticizer on said basis.

31. The composition according to claim 14 wherein said polymer is a powder.

32. The composition according to claims 1, 2, 3, 4, 6, 7, 8, 9, or 10 wherein a copper salt chelate oxidation stabilizer is additionally present in said polymer.

33. The composition according to claim 32 wherein said copper salt chelate is the copper salt/chelate of 2-hydroxy-4-methoxybenzophenone-5-sulfonic acid.

* * * * *